(12) United States Patent
Hara (10) Patent No.: US 10,720,631 B2
(45) Date of Patent: Jul. 21, 2020

(54) BATTERY AND BATTERY PACK

(71) Applicant: TOYOTA JIDOSHA KABUSHIKI KAISHA, Toyota-shi, Aichi-ken (JP)

(72) Inventor: Tetsuo Hara, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 190 days.

(21) Appl. No.: 15/835,515

(22) Filed: Dec. 8, 2017

(65) Prior Publication Data

US 2018/0175362 A1 Jun. 21, 2018

(30) Foreign Application Priority Data

Dec. 15, 2016 (JP) .................. 2016-243197

(51) Int. Cl.
| | |
|---|---|
| *H01M 2/24* | (2006.01) |
| *H01M 2/30* | (2006.01) |
| *H01M 2/10* | (2006.01) |
| *H01M 10/0525* | (2010.01) |
| *H01M 2/20* | (2006.01) |

(52) U.S. Cl.
CPC ......... *H01M 2/305* (2013.01); *H01M 2/1077* (2013.01); *H01M 2/206* (2013.01); *H01M 10/0525* (2013.01); *H01M 2220/20* (2013.01); *Y02E 60/122* (2013.01)

(58) Field of Classification Search
CPC .... H01M 2/305; H01M 2/1077; H01M 2/206; H01M 10/0525; H01M 2220/20
See application file for complete search history.

(56) References Cited

U.S. PATENT DOCUMENTS

| | | | | |
|---|---|---|---|---|
| 3,775,730 | A * | 11/1973 | Rowls ............... | H01M 2/305 439/521 |
| 5,360,303 | A * | 11/1994 | Behrens ............. | F16B 39/08 411/120 |
| 2013/0323574 | A1* | 12/2013 | Tsunaki ............. | H01M 2/206 429/158 |
| 2015/0017501 | A1 | 1/2015 | Harayama | |
| 2016/0226054 | A1* | 8/2016 | Kusama ............. | H01M 2/1072 |

FOREIGN PATENT DOCUMENTS

| | | |
|---|---|---|
| JP | 2013-105538 A | 5/2013 |
| JP | 2014-146498 A | 8/2014 |
| JP | 5626181 B2 | 11/2014 |
| WO | 2013/030880 A1 | 3/2013 |

\* cited by examiner

*Primary Examiner* — Thanh Truc Trinh
(74) *Attorney, Agent, or Firm* — Sughrue Mion, PLLC (57) ABSTRACT

A battery includes an electrode body, a case, a positive electrode external terminal, a negative electrode external terminal, an insulator, and a connection bolt, and at least one external terminal of the positive electrode external terminal and the negative electrode external terminal includes an attachment portion and a plate portion. The connection bolt includes a bar-shaped body portion and a flange portion disposed at one end of the bar-shaped body portion, and is fastened to the plate portion in a state in which at least a portion of a roof portion of the insulator is fitted between the flange portion and the plate portion.

4 Claims, 6 Drawing Sheets

//  BATTERY AND BATTERY PACK

INCORPORATION BY REFERENCE

The disclosure of Japanese Patent Application No. 2016-243197 filed on Dec. 15, 2016 including the specification, drawings and abstract is incorporated herein by reference in its entirety.

BACKGROUND

1. Technical Field

The disclosure relates to a connection structure of an external terminal in a battery. In addition, the disclosure relates to a current collecting structure including an external terminal in each of batteries constituting a battery pack.

2. Description of Related Art

A battery such as a lithium-ion secondary battery or a nickel-metal hydride battery becomes more significant as an on-vehicle power supply or a power supply for a personal computer, a portable terminal, or the like. In particular, it is thought that a lithium-ion secondary battery that is lightweight and achieves a high energy density has been increasingly distributed as an on-vehicle high-output power supply. In a case where this kind of battery is mounted in a vehicle and is used as a high-output power supply, the battery is used in a high-voltage, high-output battery pack that exceeds tens of V or 100 V. The battery pack is a battery module configured by alternately connecting positive and negative electrode terminals (external terminals) of a plurality of batteries (each of the batteries is referred to as a "single battery") of the same kind with appropriate connection members (hereinafter, also referred to as "busbars") to cause the single batteries to be connected in series.

However, the battery pack mounted in the vehicle to be used needs to have high durability against vibration and impact. Such durability is particularly significant for the external terminals of the single batteries that are connected by the busbar and are susceptible to external forces due to vibration and impact and for a current collecting structure including the external terminals and the busbars. That is, the current collecting structure including the external terminals needs to be designed so as not to be damaged or broken by impact energy (a load caused by the external force, that is, stress generated in battery constituent members) when vibration or impact from the outside is applied to a group of the single batteries (that is, the battery pack) connected by the busbars. Regarding the structure described above, for example, an example of a current collecting structure which, when an external force in a vertical direction is applied to an external terminal of a single battery included in a battery pack, reduces a load (stress) applied to an extraction electrode portion connected to the external terminal is described in WO 2013/030880.

SUMMARY

The current collecting structure disclosed in WO 2013/030880 reduces the load when the external force in the vertical direction is applied to the external terminal as described above. However, there is a demand for a structure capable of reducing energy (a load due to an external force) applied to the external terminal in various forms due to various factors. The disclosure provides a battery provided with a current collecting structure (terminal connection structure) capable of more effectively reducing energy (a load due to an external force) applied to an external terminal in various forms due to various factors, and thus capable of improving the durability of the external terminal.

A first aspect relates to a battery including: an electrode body; a case accommodating the electrode body; a positive electrode external terminal; a negative electrode external terminal; an insulator; and a connection bolt. The positive electrode external terminal and the negative electrode external terminal are disposed outside of the case. The positive electrode external terminal is electrically connected to a positive electrode of the electrode body accommodated in the case. The negative electrode external terminal is electrically connected to a negative electrode of the electrode body accommodated in the case. At least one external terminal of the positive electrode external terminal and the negative electrode external terminal includes an attachment portion attached to an outer surface of the case and a plate-shaped plate portion connected to the attachment portion. The plate portion has a through-hole. The insulator is disposed between the external terminal including the plate portion and the outer surface of the case. The connection bolt includes a bar-shaped body portion and a flange portion disposed at one end of the bar-shaped body portion. The flange portion is disposed between the plate portion and the insulator. The bar-shaped body portion penetrates through the through-hole of the plate portion and protrudes outward from the case. The insulator includes a peripheral wall portion extending in a direction from a periphery of the flange portion of the connection bolt toward the plate portion, and a roof portion extending in a direction approaching the through-hole along the plate portion from a tip end part of the peripheral wall portion. The connection bolt is fastened to the plate portion in a state in which at least a portion of the roof portion of the insulator is fitted between the flange portion and the plate portion.

With the battery according to the first aspect, the connection bolt can be easily fastened to the external terminal in the state in which a portion (the roof portion) of the insulator (that is, an insulating member) is fitted between the external terminal (specifically, the plate portion) described above and the connection bolt (specifically, the flange portion). According to the first aspect, when an undesirable external force such as vibration or unexpected impact is applied to the battery (in particular, the connection bolt disposed in a state in which the bar-shaped body portion protrudes outward from the battery case is susceptible to an external force), the external force (that is, stress generated in the battery constituent members due to the external force) can be released (transferred) to the insulator fitted between the external terminal and the connection bolt. Therefore, according to the aspect of the battery, a load (stress) applied to the external terminal by an undesirable external force such as vibration or unexpected impact can be reduced, and the durability of the external terminal against damage, breaking, and the like can be further improved. Therefore, the reliability of the battery and the battery pack in a market and in use can be further enhanced.

In the battery according to the first aspect, the flange portion of the connection bolt may be formed in a regular polygonal plate shape. The connection bolt may be provided with the flange portion having the regular polygonal plate shape which is disposed between the plate portion and the insulator and is the connection bolt. The connection bolt is configured to rotate at a predetermined angle about the bar-shaped body portion as a center axis. Here, the roof portion may be formed in a shape such that, when the connection bolt is rotated at a predetermined angle, the roof portion enters a state of overlapping with a corner in the flange portion having the regular polygonal plate shape and being fitted between the corner and the plate portion such that the connection bolt is fastened, and before the connection bolt is rotated at the predetermined angle, the roof portion does not overlap with any portion of the flange portion having the regular polygonal plate shape such that the connection bolt is not fastened.

With the battery according to the first aspect, when the connection bolt is disposed at a predetermined position, the roof portion of the insulator does not overlap with the flange portion of the connection bolt and does not act as a barrier. Therefore, during the production of the battery, an operation of mounting the connection bolt can be smoothly performed. In addition, after the connection bolt is mounted at the predetermined position, by rotating the connection bolt at the predetermined angle, the roof portion overlaps with the corner in the flange portion having the regular polygonal plate shape and the roof portion and is fitted between the corner and the plate portion. In such configuration, the connection bolt can be easily fastened to the external terminal.

In the battery according to the first aspect, the peripheral wall portion may further be provided with a bolt rotation restriction portion with which the flange portion having the regular polygonal plate shape comes into contact when the connection bolt is rotated at the predetermined angle such that the connection bolt is prevented from further rotating. According to the first aspect, by allowing the flange portion having the regular polygonal plate shape of the connection bolt to come into contact with the bolt rotation restriction portion formed in the peripheral wall portion, the rotation of the connection bolt is stopped at a suitable position, and the connection bolt can be easily and accurately fastened to the external terminal in the state in which the roof portion is fitted between the corner of the flange portion having the regular polygonal plate shape and the plate portion.

In the battery according to the first aspect, the bolt rotation restriction portion may be provided on an inner wall of the peripheral wall portion of the plate portion and under the roof portion and protrudes inward of the inner wall.

A second aspect relates to a battery pack including a plurality of the batteries according to the first aspect, the batteries being electrically connected in series. The battery pack includes a busbar that connects the bar-shaped body portion protruding outward from the case in the connection bolt of the first battery of the batteries connected in series to the bar-shaped body portion protruding outward from the case in the connection bolt of the second battery of the batteries connected in series. With the battery pack according to the second aspect, as is apparent from the foregoing description, even when an undesirable external force such as vibration or unexpected impact is applied to each of the single batteries constituting the battery pack, the external force can be released to the insulator fitted between the external terminal and the connection bolt. Therefore, with the battery pack according to the second aspect, a load (stress) applied to the external terminal in each of the single batteries by an undesirable external force such as vibration or unexpected impact can be reduced, and the durability of the external terminal against damage, breaking, and the like can be further improved.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a preferred embodiment of a current collecting structure (terminal connection structure) of a battery disclosed herein will be described with reference to the drawings. In the following drawings, like members and parts exhibiting the same action are denoted by like reference numerals, and repeated description will be omitted or simplified. The dimensional relationship (length, width, thickness, and the like) in each of the drawings does not reflect the actual dimensional relationship. In addition, matters that are not particularly mentioned in the specification and are needed to implement the embodiments can be recognized as design matters of those skilled in the art based on the related art.

As a preferred embodiment of the battery disclosed herein, a lithium-ion secondary battery is exemplified. However, it is not intended to limit an object to which the disclosure is applied to the battery. In the specification, the "battery" is a term indicating general electric storage devices from which electric energy can be taken and is a concept including primary batteries and secondary batteries. The "secondary battery" indicates general electric storage devices that can be repeatedly charged and discharged, and includes, in addition to so-called storage batteries (chemical batteries) such as lithium-ion secondary batteries, nickel—metal hydride batteries, and nickel—cadmium batteries, capacitors (that is, physical batteries) such as electric double layer capacitors. The technique disclosed herein is preferably applied to a typical sealed secondary battery.

Figure 6:
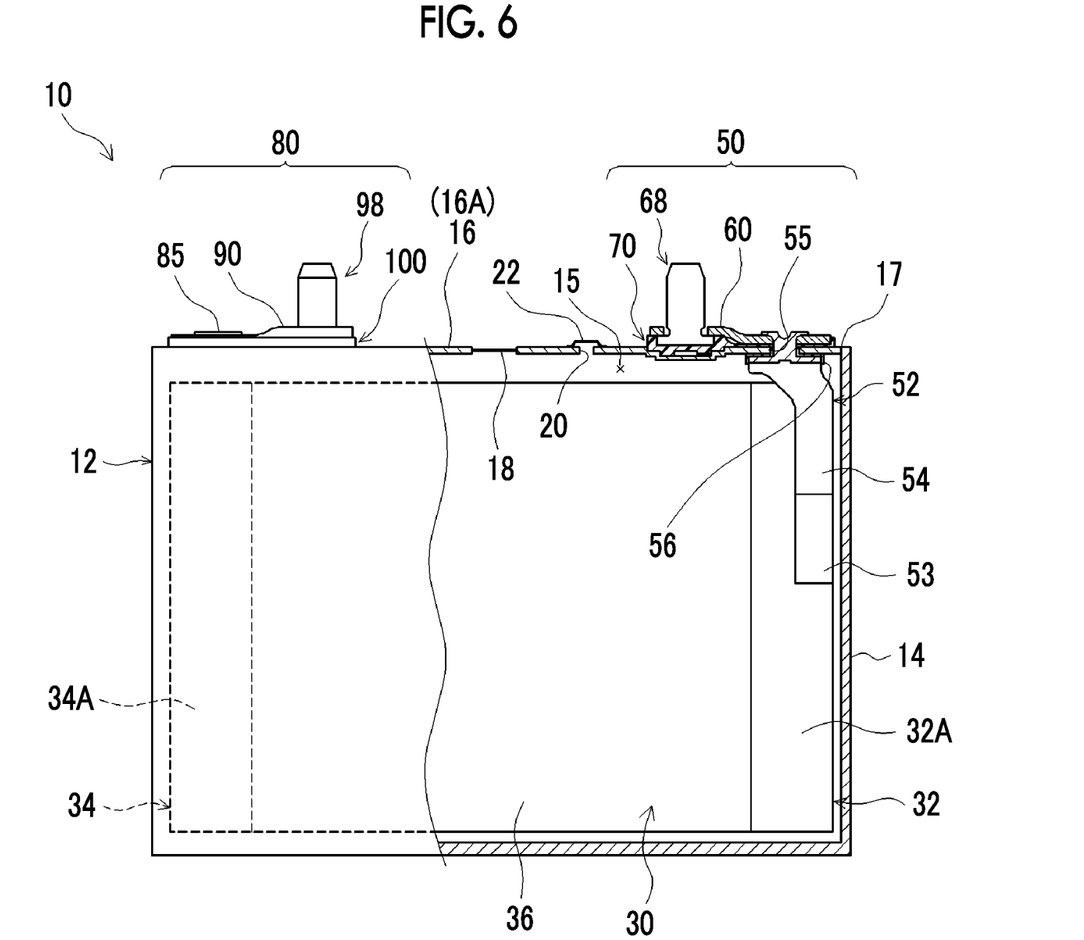
FIG. 6 is a partial sectional view schematically illustrating a configuration of a sealed battery used to describe the current collecting structure including the external terminal and the connection bolt.
Figure 7:
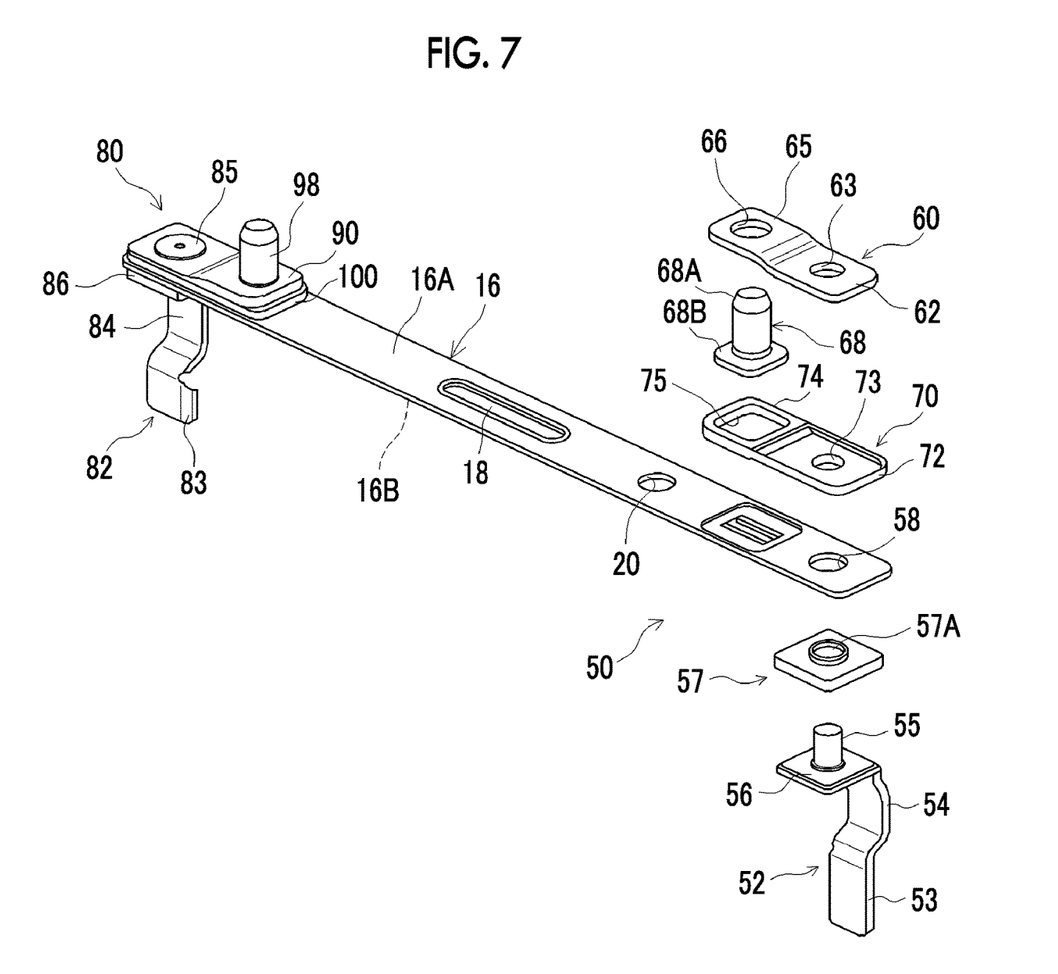
FIG. 7 is an exploded perspective view schematically illustrating the configuration of the current collecting structure illustrated in FIG. 6.

Before describing the embodiment of the current collecting structure (terminal connection structure) disclosed herein, first, an example of the configuration of the battery in which the structure is assembled will be described with reference to the drawings. FIG. 6 is a partial sectional view schematically illustrating the outer shape of a lithium-ion secondary battery 10 described herein. In addition, FIG. 7 is an exploded perspective view schematically illustrating the configuration of the current collecting structure (terminal connection structure). The illustrated lithium-ion secondary battery 10 has a configuration in which a wound electrode body 30 having predetermined battery constituent materials is accommodated in a battery case 12 having a flat rectangular shape together with an appropriate electrolytic solution.

The battery case 12 includes a case body 14 having a rectangular tube shape with a bottom in which one of the narrow faces in a flat rectangular parallelepiped shape serves as an opening 15, and a lid 16 that covers the opening 15 of the case body 14. Specifically, the lid 16 is fixed to the case body 14 by fitting the lid 16 in the opening 15 of the case body 14 and performing laser welding on a joint 17 between the outer edge of an outer surface 16A of the lid 16 and the case body 14 around the opening 15.

The material of the battery case 12 is not particularly limited as long as the material is the same as that used in the kind of sealed battery in the related art. The battery case 12 that is mainly formed of a lightweight metal material with good thermal conductivity is preferable, and examples of the metal material include aluminum, stainless steel, and nickel-plated steel. The battery case 12 (specifically, the case body 14 and the lid 16) is formed of aluminum or an alloy mainly containing aluminum. In particular, the lid 16 is made of 1000 series aluminum or 3000 series aluminum. The material mentioned above has excellent workability and facilitates the formation of the terminal connection structure, which will be described later.

As illustrated in FIG. 7, the outer shape of the lid 16 is a substantially rectangular shape suitable for the shape of the opening 15 (the opening shape of the case body 14). A safety valve 18 used to, in a case where the internal pressure of the battery case 12 increases, release the internal pressure by allowing the inside and the outside of the battery case 12 to communicate with each other is provided at the center portion of the lid 16. An injection port 20 used to inject the electrolytic solution at the time of construction of the battery is provided near the safety valve 18. After injecting the electrolytic solution, the injection port 20 is covered with an injection plug 22 (FIG. 6) and is fixed by welding. In this manner, sealing of the injection port 20 is performed. A terminal connection hole 58 through which a rivet portion of an internal terminal, which will be described later, penetrates from an inner surface 16B side toward the outer surface 16A side is formed in the lid 16.

Next, the wound electrode body 30 accommodated in the battery case 12 will be described. The wound electrode body 30 is accommodated in the battery case 12 in such a posture that the wound electrode body 30 is laid down sideways to cause a winding axis direction of the wound electrode body 30 to be parallel to a surface direction of the lid 16. The wound electrode body 30 may have the same configuration as a general wound electrode body adopted by the kind of battery in the related art. That is, typically, a positive electrode sheet 32 formed of a sheet-shaped positive electrode current collector and a positive electrode mixture layer primarily containing a positive electrode active material on the positive electrode current collector, a negative electrode sheet 34 formed of a sheet-shaped negative electrode current collector and a negative electrode mixture layer primarily containing a negative electrode active material on the negative electrode current collector, and a total of two sheet-shaped separators 36 are laminated and wound in a longitudinal direction, and the obtained wound body is formed into a flat shape, thereby preparing the wound electrode body 30.

The positive electrode sheet 32 and the negative electrode sheet 34 are wound in a laminated state in which the positions of the positive electrode sheet 32 and the negative electrode sheet 34 are slightly shifted in the winding axis direction (the horizontal direction in FIG. 6) and first ends of the sheets 32, 34 in the width direction protrude from a first end and a second end of the separator 36 in the width direction. At a first end portion and a second end portion of the wound electrode body 30 in the winding axis direction, a positive electrode current collector exposed portion 32A where one end of the positive electrode sheet 32 in the width direction protrudes outward from a winding core part (that is, a wound part of the positive electrode sheet 32, the negative electrode sheet 34, and the two separators 36) and the positive electrode mixture layer is not formed, and a negative electrode current collector exposed portion 34A where one end of the negative electrode sheet 34 in the width direction protrudes outward from the winding core part and the negative electrode mixture layer is not formed, are respectively formed.

The materials forming the wound electrode body 30 and the member itself may be the same as those of an electrode body provided in the lithium-ion secondary battery in the related art and are not particularly limited. For example, the positive electrode current collector may be formed of an aluminum foil, the negative electrode current collector may be formed of a copper foil, and the separator 36 may be formed of a thermoplastic resin such as polyethylene or polypropylene. As the positive electrode active material, a lithium-transition metal composite oxide having a layered structure, a lithium-transition metal composite oxide having a spinel structure, or the like used in the positive electrode of a general lithium-ion secondary battery is preferably used. As a suitable negative electrode active material, there is a carbon material such as graphite, non-graphitizable carbon (hard carbon), or easily graphitizable carbon (soft carbon). As the electrolytic solution interposed between the positive electrode sheet 32 and the negative electrode sheet 34, a non-aqueous electrolytic solution containing a non-aqueous solvent (organic solvent) and a lithium salt (support electrolyte) that can be dissolved in the solvent is preferably used. The kinds of the solvent and the support electrolyte that are used may be the same as those used in the related art and are not particularly limited. In addition, the positive electrode mixture layer and the negative electrode mixture layer may contain components such as a binder, a conductive material, and the like in addition to the active materials as main components. However, since the components have no relation to the description, a detailed description thereof will be omitted. In addition, the electrode body is not limited to the wound electrode body 30 described above. For example, a so-called laminated electrode body formed by laminating a number of sheet-shaped positive electrodes and negative electrodes with separators interposed therebetween may also be adopted.

Next, the current collecting structure (terminal connection structure) in the lithium-ion secondary battery 10 illustrated in FIGS. 6 and 7 will be described. The positive electrode sheet 32 and the negative electrode sheet 34 are respectively provided with a positive electrode current collecting structure 50 and a negative electrode current collecting structure 80. Specifically, the positive electrode current collecting structure 50 is a structure configured to roughly include a positive electrode internal terminal 52 that is disposed inside the lid 16 and is joined to a portion of the positive electrode current collector exposed portion 32A with welding means, a positive electrode external terminal 60 that is disposed outside the lid 16 and is electrically connected to the positive electrode internal terminal 52, and a positive electrode connection bolt (male screw) 68 that is electrically connected to the positive electrode external terminal 60, and further include various parts used to connect the members mentioned above. Similarly, the negative electrode current collecting structure 80 is a structure configured to include a negative electrode internal terminal 82 that is disposed inside the lid 16 and is joined to a portion of the negative electrode current collector exposed portion 34A with welding means, a negative electrode external terminal 90 that is disposed outside the lid 16 and is electrically connected to the negative electrode internal terminal 82, and a negative electrode connection bolt (male screw) 98 that is electrically connected to the negative electrode external terminal 90, and further include various members used to connect the members mentioned above.

As illustrated in FIG. 7, the positive electrode internal terminal 52 is typically a metal conductive member having a tip end joining portion 53 including the portion welded to the positive electrode current collector exposed portion 32A, a first lead portion 54 extending in a plate shape in a direction from the tip end joining portion 53 toward the lid 16, a plate-shaped second lead portion 56 that is connected to the upper end of the first lead portion 54 and is bent substantially at right angles from the upper end to face the inner surface 16B of the lid 16, and a rivet portion 55 protruding from the second lead portion 56. In addition, as illustrated in FIG. 7, an internal insulating member 57 having a hole shape in which a rivet mounting hole 57A is formed is mounted to the upper surface of the second lead portion 56 by causing the rivet portion 55 to penetrate through the rivet mounting hole 57A. Accordingly, as will be described later, direct contact between the positive electrode internal terminal 52 and the lid 16 is prevented. Although not particularly limited, the positive electrode current collector exposed portion 32A and the tip end joining portion 53 of the positive electrode internal terminal 52 are joined to each other by suitable welding means such as ultrasonic welding. In addition, as illustrated in the figures, the negative electrode internal terminal 82 is also a terminal member having a tip end joining portion 83, a first lead portion 84, a second lead portion 86, and a rivet portion 85, and the basic configuration thereof including the internal insulating member is the same as that of the positive electrode internal terminal 52. Therefore, repeated description will be omitted.

As illustrated in FIGS. 6 and 7, the positive electrode external terminal 60 disposed on the outer surface of the battery case 12 is typically a conductive plate-shaped member made of metal and provided with an attachment portion 62 attached to the outer surface of the battery case 12 (specifically, the outer surface 16A of the lid 16) and a plate-shaped plate portion 65 connected to the attachment portion 62, and a through-hole 66 is formed substantially at the center of the plate portion 65. Since the negative electrode external terminal 90 has the same configuration, repeated description will be omitted.

Furthermore, on the outer surface of the battery case 12 (specifically, the outer surface 16A of the lid 16), an insulator 70 is provided between the positive electrode external terminal 60 including the plate portion 65 and the battery case 12 (the lid 16). The insulator 70 is an insulating member that is mounted to the outside of the battery case 12 to prevent a short circuit between the positive electrode external terminal 60 and the battery case 12 (specifically, the lid 16), and is a member formed in a tray shape on which the positive electrode external terminal 60 is placed. Specifically, the insulator 70 includes a body frame portion 72 that accommodates the attachment portion 62 of the positive electrode external terminal 60, a bolt placing recess 75 in which a flange portion 68B of the positive electrode connection bolt 68 can be placed, and a peripheral wall portion 74 formed to be upright in a direction from the periphery of the bolt placing recess 75 toward the positive electrode external terminal 60 (specifically, the plate portion 65). An insulator 100 having the same configuration is provided on the negative electrode side. As the material forming the insulators 70, 100 and the internal insulating member 57, an insulating synthetic resin material or an elastomer material can be appropriately selected and formed into a predetermined shape for use. For example, a synthetic resin material such as a polyphenylene sulfide resin (PPS), a polyimide resin, a polyamide imide resin, a polyether ether ketone resin (PEEK), polyether ketone ketone resin (PEKK), or a polyether sulfone resin (PES) is preferably adopted. Alternatively, a polymer material such as a polyolefin resin such as polypropylene (PP) or polyethylene (PE) or a fluororesin such as a tetrafluoroethylene-perfluoroalkyl vinyl ether resin (PFA) or polytetrafluoroethylene (PTFE) may be used.

As illustrated in the figures, the positive electrode connection bolt 68 is a metal bolt constituted by a bar-shaped body portion 68A forming the male screw (threads are not illustrated) and the flange portion 68B formed in a flat square (regular quadrilateral) shape. Since the negative electrode connection bolt 98 has the same configuration, repeated description will be omitted.

Next, the construction of the current collecting structure (terminal connection structure) using each of the members described above will be described. In the following description, the positive electrode side is described, and the same applies to the negative electrode side. The rivet portion 55 of the positive electrode internal terminal 52 is caused to penetrate through the rivet mounting hole 57A of the internal insulating member 57, and in this state, the rivet portion 55 is further inserted into the terminal connection hole 58 from the inner surface 16B side of the lid 16 to penetrate through the outer surface 16A of the lid 16. Furthermore, on the outer surface side of the lid 16, the rivet portion 55 is passed through a terminal passage hole 73 of the insulator 70 disposed at a predetermined position of the outer surface 16A of the lid 16. At this time, the regular quadrilateral-shaped flange portion 68B of the positive electrode connection bolt 68 is placed in the bolt placing recess 75 of the insulator 70. The positive electrode external terminal 60 is further mounted on the rivet portion 55 that penetrates through the terminal passage hole 73 of the insulator 70. Specifically, the rivet portion 55 is inserted through an attachment hole 63 of the positive electrode external terminal 60. At the same time, the bar-shaped body portion 68A of the positive electrode connection bolt 68 placed in the bolt placing recess 75 of the insulator 70 is inserted through the through-hole 66 of the positive electrode external terminal 60.

With the configuration described above, by engaging the rivet portion 55 of the positive electrode internal terminal 52 with another member, the positive electrode internal terminal 52, the internal insulating member 57, the lid 16, the insulator 70, and the positive electrode external terminal 60 are integrated. In addition, the positive electrode connection bolt 68 can be further provided via the positive electrode external terminal 60. By deforming and riveting the tip end part of the rivet portion 55 that penetrates through the rivet mounting hole 57A, the terminal connection hole 58, the terminal passage hole 73, and the attachment hole 63 and protrudes from the upper surface of the attachment portion 62 of the positive electrode external terminal 60 (see the rivet portion 85 on the negative electrode side in FIG. 7), the current collecting structure (terminal connection structure) in which the positive electrode internal terminal 52, the lid 16, the insulator 70, the positive electrode external terminal 60, the positive electrode connection bolt 68 are integrated can be formed. The same applies to the negative electrode side.

Although not illustrated in FIGS. 6 and 7, in the current collecting structure, by fitting and tightening a nut (female screw; see FIG. 3) or a washer (which may be a busbar as will be described later) corresponding to the bar-shaped body portion 68A of the positive electrode connection bolt 68 in a state of penetrating through the through-hole 66 of the positive electrode external terminal 60 and protruding outward from the battery case 12 (the lid 16), the positive electrode connection bolt 68 can be suitably fastened to the plate portion 65 of the positive electrode external terminal 60. The same applies to the negative electrode side.

Hereinabove, the overall configuration and construction procedures of the current collecting structures 50, 80 in the lithium-ion secondary battery 10 described herein have been described. Next, a preferred embodiment of the current collecting structure (terminal connection structure) disclosed herein will be described with reference to FIGS. 1 to 5. Parts that are not particularly described are the same as the structures, members, arrangement states, and the like illustrated in FIGS. 6 and 7 described above. In the following description, the current collecting structure on the positive electrode side is described. However, the same current collecting structure may be provided on the negative electrode side.

Figure 1:
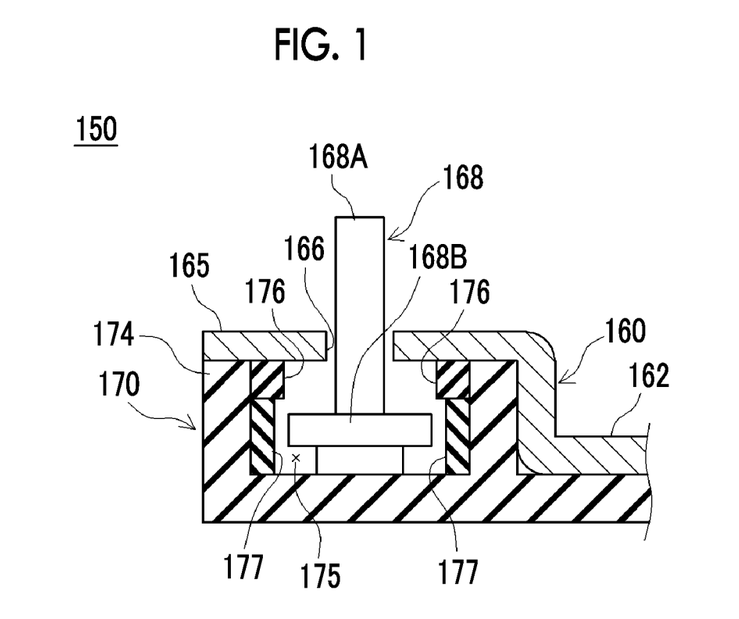
FIG. 1 is a sectional view schematically illustrating a current collecting structure (terminal connection structure) of a battery according to an embodiment in a state before an external terminal and a connection bolt are fastened together.
Figure 2:
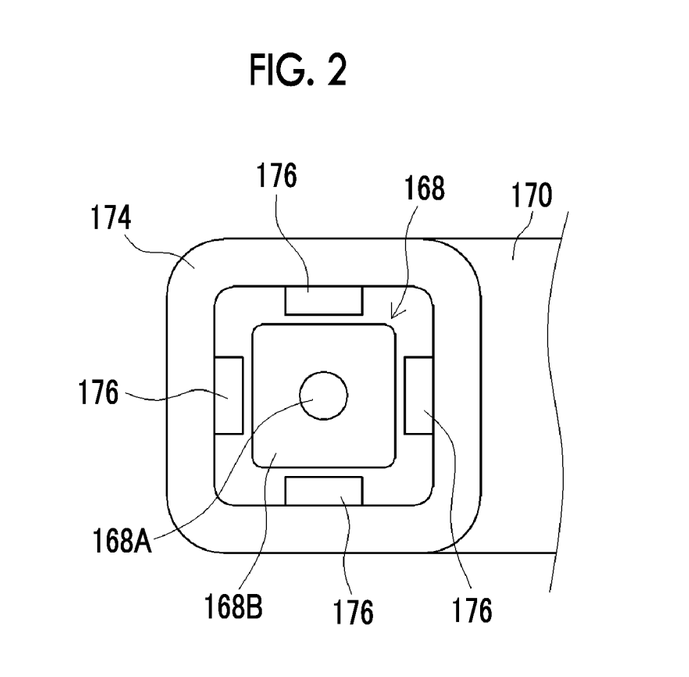
FIG. 2 is a plan view schematically illustrating the current collecting structure (terminal connection structure) of the battery according to the embodiment in the state before the external terminal and the connection bolt are fastened together.

FIG. 1 is a sectional view schematically illustrating characteristic parts of a positive electrode current collecting structure (terminal connection structure) 150 according to the embodiment. In addition, FIG. 2 is a plan view schematically illustrating the characteristic parts in a state in which a positive electrode external terminal 160 is removed. FIGS. 1 and 2 illustrate a state before the positive electrode external terminal 160 and a positive electrode connection bolt 168 are fastened to each other. Specifically, as illustrated in the figures, an insulator 170 according to the embodiment is disposed between an attachment portion 162 and a plate portion 165 of the positive electrode external terminal 160 and the outer surface of a battery case (not illustrated). The positive electrode connection bolt 168 according to the embodiment, which is provided with a regular quadrilateral-shaped flange portion 168B and a bar-shaped body portion 168A, is disposed in a bolt placing recess 175 of the insulator 170. That is, the positive electrode connection bolt 168 is disposed such that the flange portion 168B is disposed between the plate portion 165 and the insulator 170 (the bolt placing recess 175) and the bar-shaped body portion 168A penetrates through a through-hole 166 of the plate portion 165 and enters a state of protruding outward from the case. At this time, the positive electrode connection bolt 168 is provided to rotate at a predetermined angle about the bar-shaped body portion 168A as the center axis.

On the other hand, the insulator 170 according to the embodiment includes a square-shaped peripheral wall portion 174 formed to be upright in a direction from the periphery of the flange portion 168B of the positive electrode connection bolt 168 disposed in the bolt placing recess 175 toward the plate portion 165, and a roof portion 176 formed to extend in a direction approaching the through-hole 166 along the plate portion 165 from the tip end part of the peripheral wall portion 174. Furthermore, a bolt rotation restriction portion 177 which protrudes inward is formed on the inner wall of the peripheral wall portion 174 and under the roof portion 176. A total of four roof portions 176 and four bolt rotation restriction portions 177 are formed corresponding to the respective sides of the peripheral wall portion 174. As illustrated in FIG. 2, the roof portion 176 is formed in a shape that overlaps with any portion of the flange portion 168B when fastening of the roof portion 176, which will be described later, is not achieved. That is, when the roof portion 176 is not fastened, the roof portion 176 is in a state of not overlapping with any part of the flange portion 168B, in other words, there is a gap between the roof portion 176 and the flange portion 168B. Therefore, as is apparent from FIG. 1, the roof portion 176 is formed so as not to become a barrier when the positive electrode connection bolt 168 is disposed in the bolt placing recess 175.

Figure 3:
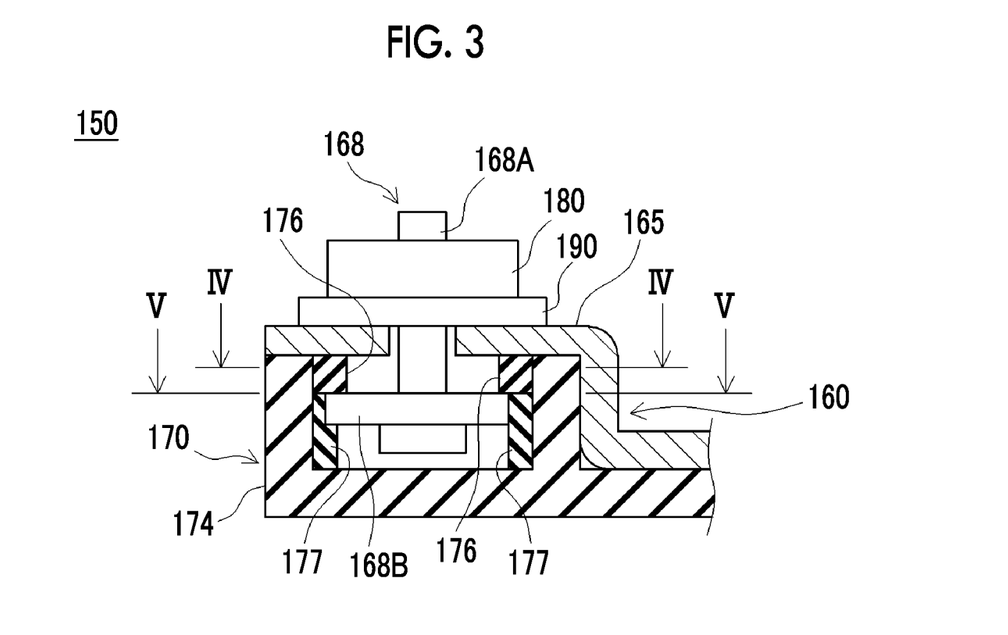
FIG. 3 is a sectional view schematically illustrating the current collecting structure (terminal connection structure) of the battery according to the embodiment in a state in which the external terminal and the connection bolt are fastened together.

Next, the fastening state of the positive electrode external terminal 160 and the positive electrode connection bolt 168 in the positive electrode current collecting structure (terminal connection structure) 150 according to the embodiment will be described. As illustrated in FIG. 3, a busbar (which may also function as a washer) 190 used to serially connect positive and negative electrodes of two single batteries is mounted on the bar-shaped body portion 168A of the positive electrode connection bolt 168 that has passed through the through-hole 166, and a nut (female screw) 180 for fastening is further mounted thereon. By tightening the nut 180, the flange portion 168B corresponding to the head portion of the positive electrode connection bolt 168 is fastened to the plate portion 165 of the positive electrode external terminal 160 with the busbar 190 interposed therebetween.

Figure 4:
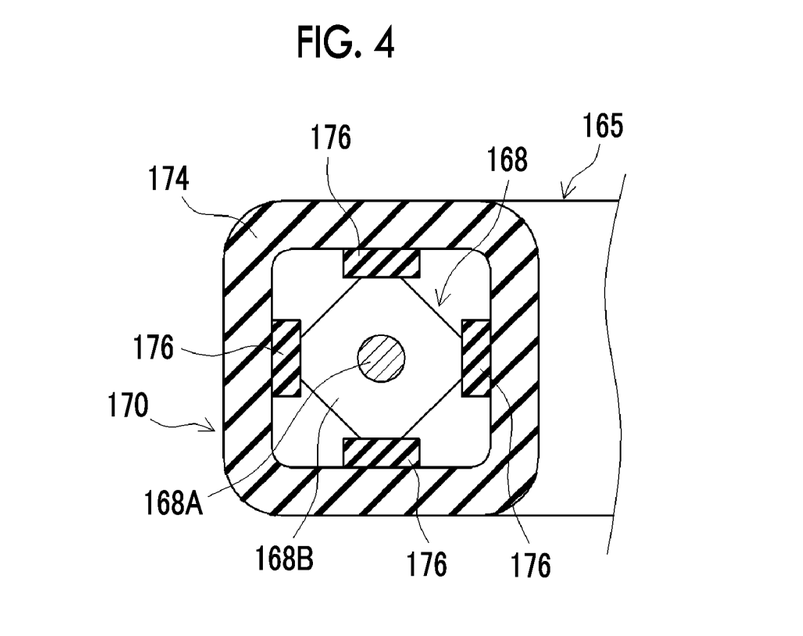
FIG. 4 is a sectional view taken along the line IV-IV in FIG. 3.

At this time, in the embodiment, before the fastening is completed, the positive electrode connection bolt 168 is rotated at a predetermined angle (here, 45° from the position illustrated in FIG. 2 to the position illustrated in FIG. 4) to cause the four corners (corner portions) of the flange portion 168B to come into overlap with the corresponding roof portions 176 (FIG. 4). Accordingly, the fastening can be performed in the state in which the roof portions 176 of the insulator 170 are fitted between the four corners of the flange portion 168B and the plate portion 165. Therefore, with the positive electrode current collecting structure 150 having the configuration, when an external force is applied to the positive electrode connection bolt 168 disposed in the state in which the bar-shaped body portion 168A protrudes outward from the lithium-ion secondary battery 10, particularly the battery case 12, the external force (stress generated in the battery constituent members due to the external force) can be released to the insulator 170 fitted between the positive electrode external terminal 160 and the positive electrode connection bolt 168.

Figure 8:
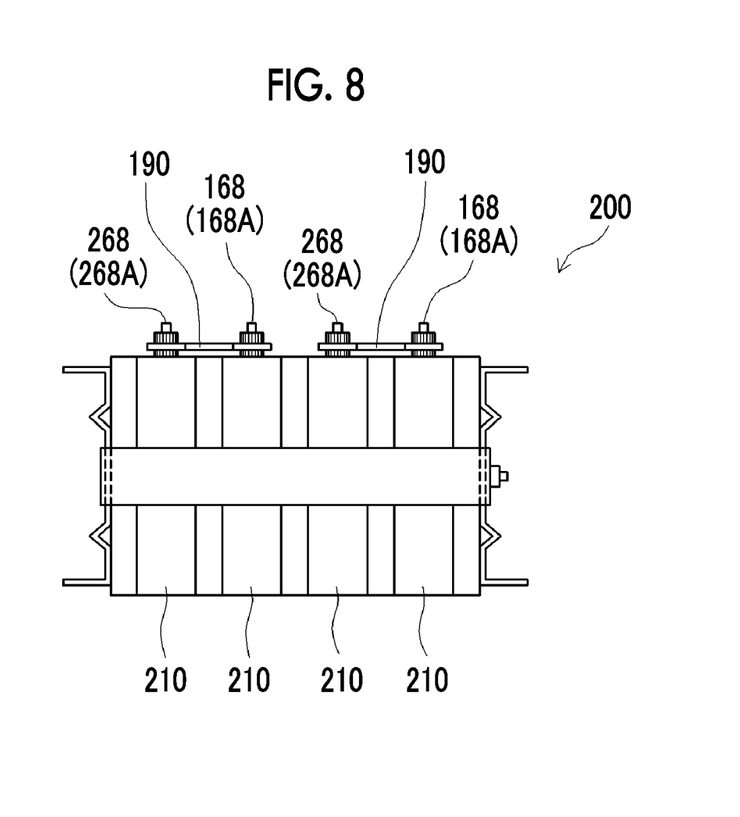
FIG. 8 is a side view schematically illustrating an example of the configuration of a battery pack.

Accordingly, as illustrated in FIG. 8, a battery pack 200 in which single batteries 210 are electrically connected in series and the bar-shaped body portion 168A in the positive electrode connection bolt 168 of the first battery of the batteries connected in series and a bar-shaped body portion 268A in a negative electrode connection bolt 268 of the second battery of the batteries connected in series are connected by the busbar 190 can be constructed. Therefore, in the battery pack 200 having the configuration, a load (stress) applied to the current collecting structure (terminal connection structure) including the external terminal in each of the single batteries 210 by an undesirable external force such as vibration or unexpected impact can be reduced, and the durability of the current collecting structure (terminal connection structure) against damage, breaking, and the like can be further improved. In addition, although the battery pack 200 having four single batteries is illustrated in FIG. 8, the number of single batteries constituting the battery pack is not limited at all in the embodiment.

Figure 5:
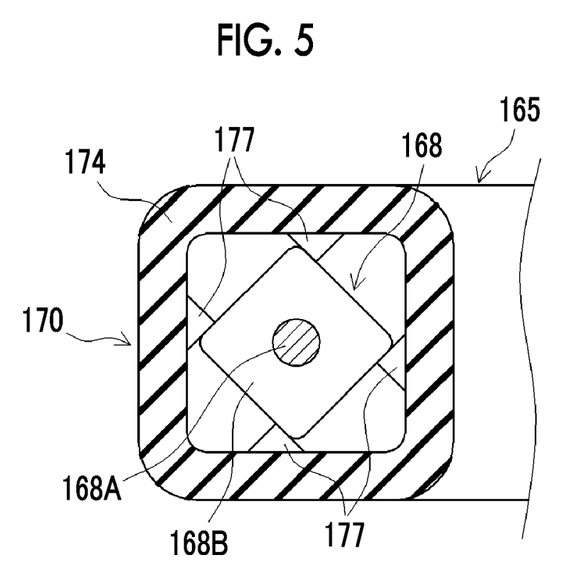
FIG. 5 is a sectional view taken along the line V-V in FIG. 3.

In addition, in the embodiment, as described above, the bolt rotation restriction portions 177 are formed in the insulator 170. Therefore, rotation of the positive electrode connection bolt 168 disposed in the bolt placing recess 175 at a predetermined angle (here, 45°) for the fastening can be easily and accurately performed. That is, as illustrated in FIG. 5, when the positive electrode connection bolt 168 is rotated, the flange portion 168B of the positive electrode connection bolt 168 comes into contact with the bolt rotation restriction portion 177 such that the rotation can be stopped at a desired position (the position illustrated in FIG. 4). In addition, since the bolt rotation restriction portion 177 functions as a stopper for the positive electrode connection bolt 168, the fastening can be more reliably performed. Therefore, the positive electrode current collecting structure 150 with higher reliability can be constructed.

While the specific examples have been described above in detail, the specific examples are merely examples and do not limit the scope of the claims. Techniques described in the claims include various modifications and changes of the specific examples described above. For example, the flange portion of the connection bolt described above is not limited to the regular quadrilateral shape (square shape) and may be another regular polygonal shape such as a regular triangular shape or a regular hexagonal shape. In addition, the number of roof portions or bolt rotation restriction portions provided on the peripheral wall portion of the insulator need not be the number corresponding to the entire corners of the flange portion having a regular polygonal shape and may be one or more smaller than the number of corners.

What is claimed is:

1. A battery comprising:
   an electrode body;
   a case accommodating the electrode body;
   a positive electrode external terminal and a negative electrode external terminal which are disposed outside of the case, the positive electrode external terminal being electrically connected to a positive electrode of the electrode body accommodated in the case, the negative electrode external terminal being electrically connected to a negative electrode of the electrode body accommodated in the case, at least one external terminal of the positive electrode external terminal and the negative electrode external terminal including an attachment portion attached to an outer surface of the case and a plate-shaped plate portion connected to the attachment portion, the plate portion having a through-hole;
   an insulator disposed between the external terminal including the plate portion and the outer surface of the case; and
   a connection bolt including a bar-shaped body portion and a flange portion disposed at one end of the bar-shaped body portion, the flange portion being disposed between the plate portion and the insulator, the bar-shaped body portion penetrating through the through-hole of the plate portion and protruding outward from the case,
   wherein:
   the insulator includes a peripheral wall portion extending in a first direction from a periphery of the flange portion of the connection bolt toward the plate portion, and a roof portion extending in a second direction approaching the through-hole along the plate portion from a tip end part of the peripheral wall portion, wherein a bolt placing recess is provided within the peripheral wall portion;
   and
   the connection bolt is fastened to the plate portion in a state in which at least a portion of the roof portion of the insulator is fitted between the flange portion and the plate portion,
   the flange portion of the connection bolt is formed in a regular polygonal plate shape;
   the connection bolt is provided with the flange portion having the regular polygonal plate shape which is disposed between the plate portion and the insulator, the connection bolt being configured to rotate at a predetermined angle about the bar-shaped body portion as a center axis;
   the roof portion is formed in a shape such that, when the connection bolt is placed within the bolt placing recess and before the connection bolt is rotated at the predetermined angle, the roof portion does not overlap with any portion of the flange portion having the regular polygonal plate shape such that the connection bolt is not fastened, and after the connection bolt is rotated at the predetermined angle within the bolt placing recess, the roof portion enters a state of overlapping with a corner of the flange portion having the regular polygonal plate shape and being fitted between the corner and the plate portion such that the connection bolt is fastened.

2. The battery according to claim 1, wherein the peripheral wall portion is further provided with a bolt rotation restriction portion with which the flange portion having the regular polygonal plate shape comes into contact when the connection bolt is rotated at the predetermined angle such that the connection bolt is prevented from further rotating, wherein the bolt placing recess is within the bolt rotation restriction portion.

3. The battery according to claim 2, wherein the bolt rotation restriction portion is provided on an inner wall of the peripheral wall portion of the plate portion and under the roof portion and protrudes inward of the inner wall.

4. A battery pack comprising:
   a plurality of the batteries according to claim 1, the batteries being electrically connected in series; and
   a busbar that connects the bar-shaped body portion protruding outward from the case in the connection bolt of a first battery of the batteries connected in series to the bar-shaped body portion protruding outward from the case in the connection bolt of a second battery of the batteries connected in series.

* * * * *